United States Patent
Daup et al.

(10) Patent No.: US 9,683,877 B2
(45) Date of Patent: Jun. 20, 2017

(54) PNEUMATIC FILTER

(71) Applicant: Rosemount Aerospace Inc., Burnsville, MN (US)

(72) Inventors: Michael Robert Daup, Minneapolis, MN (US); Andrew Sherman, Farmington, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 143 days.

(21) Appl. No.: 14/601,768

(22) Filed: Jan. 21, 2015

(65) Prior Publication Data

US 2016/0209253 A1 Jul. 21, 2016

(51) Int. Cl.
*G01F 1/46* (2006.01)
*G01L 19/00* (2006.01)
*G01P 5/14* (2006.01)

(52) U.S. Cl.
CPC ............ *G01F 1/46* (2013.01); *G01L 19/0007* (2013.01); *G01P 5/14* (2013.01)

(58) Field of Classification Search
None
See application file for complete search history.

(56) References Cited

U.S. PATENT DOCUMENTS

| | | | |
|---|---|---|---|
| 7,380,459 B1 * | 6/2008 | Sapir | G01L 9/0022 73/702 |
| 2002/0092355 A1 * | 7/2002 | Davey | G01M 3/2853 73/700 |
| 2003/0056598 A1 | 3/2003 | Kimura et al. | |
| 2005/0223813 A1 * | 10/2005 | Lull | G01F 1/696 73/861 |
| 2011/0107840 A1 * | 5/2011 | Kurtz | G01L 9/0052 73/714 |
| 2011/0185818 A1 * | 8/2011 | Kurtz | G01L 7/022 73/721 |
| 2012/0301800 A1 * | 11/2012 | Carew | A01K 63/045 429/416 |

(Continued)

FOREIGN PATENT DOCUMENTS

WO        2008025931        3/2008

OTHER PUBLICATIONS

Extended European Search Report dated Jul. 1, 2016 in European Application No. 16152102.6.

*Primary Examiner* — Andre Allen
(74) *Attorney, Agent, or Firm* — Snell & Wilmer L.L.P.

(57) ABSTRACT

A tuned sensor system is disclosed. The tuned sensor system may receive an unsteady pressure from an external environment via a pressure inlet port. The pressure may have a first component that is substantially static and a second component that varies at a relatively high frequency. The pressure inlet port may conduct the unsteady pressure to a tuned path. The tuned path may filter the unsteady pressure, blocking the second component and communicating the first component, such as for use by a pressure sensor. The tuned sensor system may be compact and may include one or more turn in the tuned path so that the distance between the pressure inlet port and the sensor is less than the length of the tuned path. The tuned path may be entirely within the supporting structure of the tuned sensor system, easing installation, removal, and maintenance of the compact and modular system.

19 Claims, 6 Drawing Sheets

(56) References Cited

U.S. PATENT DOCUMENTS

| | | | |
|---|---|---|---|
| 2013/0335075 A1* | 12/2013 | Davis | G01R 33/1215 |
| | | | 324/239 |
| 2014/0041457 A1* | 2/2014 | Kurtz | G01L 9/06 |
| | | | 73/707 |
| 2014/0260519 A1 | 9/2014 | Hurst et al. | |
| 2016/0209289 A9* | 7/2016 | Hurst | G01L 27/002 |

\* cited by examiner

PNEUMATIC FILTER

FIELD

The present disclosure relates to the field of pressure sensing. More particularly, the present disclosure relates to tuned sensor systems having pneumatic filters.

BACKGROUND

Certain aircraft may create pressure oscillations in key areas around the aircraft, including near pressure inlet ports such as pitot-static ports. Due to the accuracy and precision of pressure sensors within the aircraft's air data system, these oscillations can be measured and/or aliased. Pressure data collected from the pressure sensors is used as inputs to air data calculations and flight control systems. The oscillations cause unwanted errors in the pressure data, deleteriously affecting air data calculations and flight control system performance. Prior implementations include installing long lengths of tubing between the sensor and the pressure inlet ports which diminish the effect of the pressure oscillations; however, such lengths of tubing are typically routed through the aircraft, presenting design challenges and causing undesirable maintenance actions.

SUMMARY OF THE INVENTION

In accordance with various aspects of the present invention, a modular tuned sensor system is disclosed. The modular tuned sensor system may include a main body having a tuned path in fluidic communication with a pressure inlet port, and an enclosing member having a substantially planar structure defining a portion of the tuned path of the main body and substantially sealing the tuned path from leaking. The pressure inlet port may have an aperture disposed in the enclosing member. The modular tuned sensor system may also have a sensor terminus having an aperture defined through the main body and in fluidic communication with the tuned path.

A tuned sensor system is disclosed. The tuned sensor system may include a pressure inlet port receiving an unsteady pressure with a first component having a substantially static pressure and a second component having a high frequency variable pressure from an external environment, and a tuned path receiving the unsteady pressure from the pressure inlet port and conducting the first component to a sensor terminus and blocking the second component.

A method of pneumatic filtering is disclosed. The method may include receiving an unsteady pressure at a pressure inlet port wherein the unsteady pressure has a first component with a substantially static pressure and a second component with a variable pressure, conducting the unsteady pressure from the pressure inlet port to a tuned path disposed in a main body, transmitting the first component of the unsteady pressure to a sensor terminus, and blocking the second component of the unsteady pressure.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims. Furthermore, any reference to singular includes plural embodiments, and any reference to more than one component or step may include a singular embodiment or step. Surface shading lines may be used throughout the figures to denote different parts but not necessarily to denote the same or different materials.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, to "block" means to diminish in amplitude sufficiently as to be non-deleterious to subsequent processing. For instance, to block a high frequency pressure variation means to diminish the magnitude of the pressure variation until it is non-deleterious to a sensor attempting to determine the static pressure component away from which the variation is diverging. In various instances, such as with reference to the discussion herein wherein a roll-off frequency comprises a 3-dB point (discussed below), "to block" means to diminish by at least 3 decibels in amplitude.

Airplanes typically utilize air pressure inlet ports in combination with pressure sensors to sense external air pressures. Both static pressures and dynamic pressures are sensed. For instance, static pressure may be sensed by a pitot-static system to determine pressure altitude, while dynamic pressure may be sensed by an airspeed indication system to determine airspeed. The external air pressures at the air pressure inlet ports may contain unwanted noise, such as variations arising from propellers, localized airflow turbulence, flight control surface actuation, and other causes. As such, the sensed pressures may oscillate or otherwise vary. Thus, it may be desired to filter out these oscillations or other variations.

Moreover, it may be desired to co-locate sensors near pressure inlet ports to minimize laborious maintenance tasks such as leak checks and sealing operations. Accordingly, various systems to address these considerations, among others, are presented herein.

Figure 1:
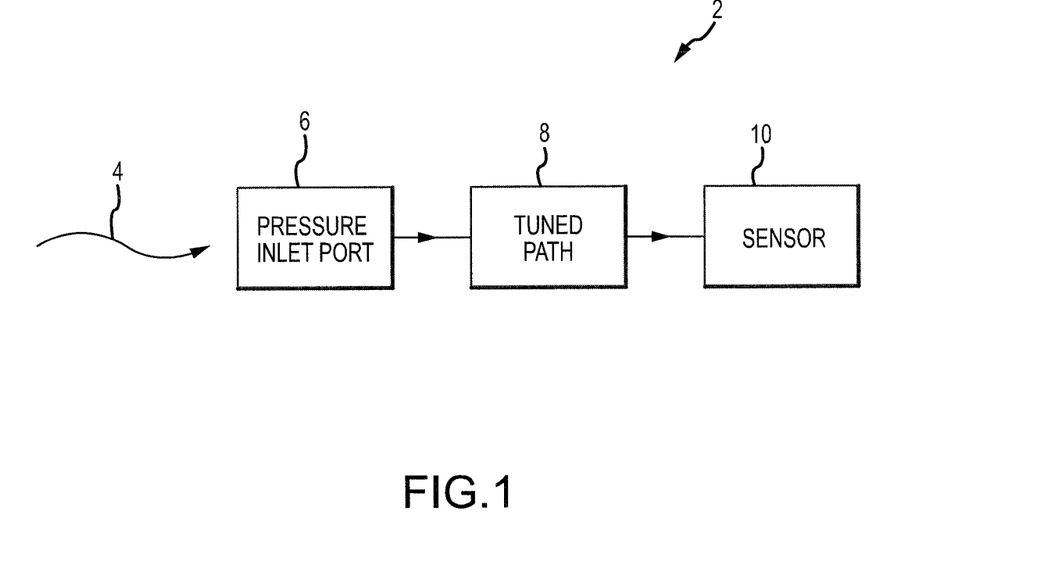
FIG. 1 depicts a block diagram of various functional units of a tuned sensor system, in accordance with various embodiments.

With reference to FIG. 1, a tuned sensor system 2 may comprise a pressure inlet port 6. The pressure inlet port 6 may comprise an aperture aligned to an opening in an external surface of an aircraft. In various embodiments, the pressure inlet port 6 may comprise an aperture in any other surface proximate to a pressure desired to be evaluated, such as aligned to an opening in a propulsion system surface (e.g., a turbine engine structure). The pressure inlet port 6 may receive an unsteady pressure 4.

Figure 3:
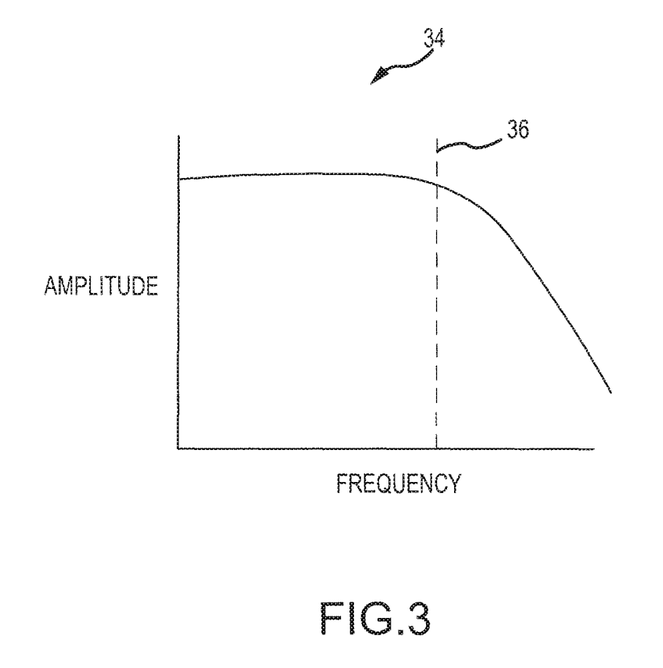
FIG. 3 depicts various behavior of a tuned sensor system, in accordance with various embodiments.

An unsteady pressure 4 may comprise an air pressure having unwanted variations. For example, an unsteady pressure 4 may be a substantially static pressure superimposed with a high frequency variation, such as a pressure variation caused by a rotating propeller. Thus the unsteady pressure 4 may have a first component comprising a substantially static pressure and a second component comprising a high frequency (e.g., substantially varying) component. As will be discussed, a tuned path 8 may be configured to block the second component comprising a high frequency component, but transmit the first component comprising a substantially static pressure. With reference to FIG. 3, the tuned path 8 may be designed so that a roll-off frequency 36 corresponds to a frequency disposed between the first component and the second component.

The tuned sensor system 2 may comprise a tuned path 8. The tuned path 8 may comprise a fluidic conduit between the pressure inlet port 6 and a sensor 10, whereby at least a portion of unsteady pressure 4 is conducted to the sensor 10. For instance, the tuned path 8 may comprise a length of tubing configured to conduct substantially static components of unsteady pressure 4 to the sensor 10, but to block high frequency pressure variations from conduction to the sensor 10.

The tuned sensor system 2 may comprise a sensor 10. Sensor 10 may comprise a pressure sensor and/or transducer in fluidic communication with the tuned path 8. The sensor 10 may comprise a piezoelectric sensor element, a piezoresistive sensor element, a capacitive sensor element, or any suitable sensor element whereby fluid pressure may be assessed. The sensor may assess a fluid pressure of a fluid and produce an electronic signal for use by other systems, such as avionics.

As briefly mentioned, the tuned sensor system may comprise a tuned path 8. The tuned path 8 may comprise further features. For example, with reference to FIG. 2, the tuned path 8 may comprise a shape 28, a radius 30, a length 32. Moreover, with reference to FIGS. 2 and 3, the tuned path 8 may exhibit a behavior 34 in response to the shape 28, radius 30, and length 32.

Figure 2:
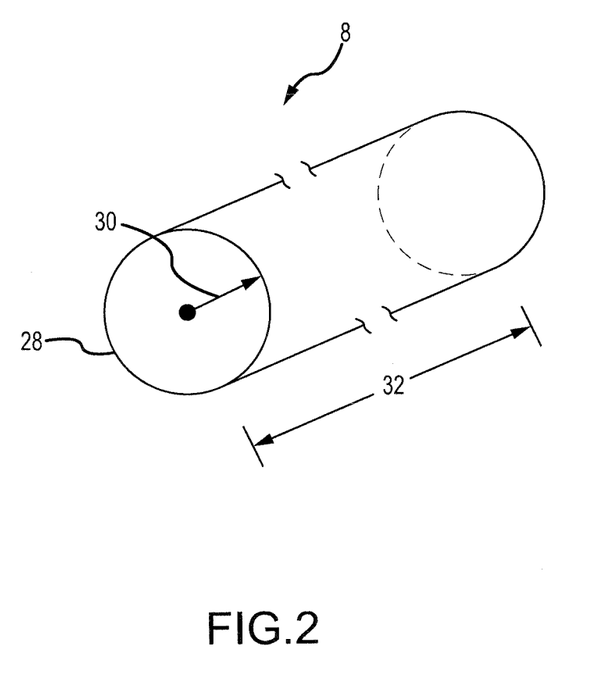
FIG. 2 depicts a block diagram of various features of a tuned path of a tuned sensor system, in accordance with various embodiments.

The shape 28 may comprise a tubular structure having a circular cross-section. However, in further embodiments, the shape 28 may comprise an oval structure, or may comprise a trapezoidal structure (such as to include sharp corners to induce high frequency rejection via standing waves), or may comprise a structure transitioning among a variety of cross-sectional shapes (such as to induce impedance bumps). Furthermore, the shape 28 may comprise a channel or groove structure rather than a tubular structure. As such, the shape 28 may comprise any structure whereby a first component of unsteady pressure 4 is conducted between the pressure inlet port 6 and the sensor 10, and a second component of unsteady pressure 4 is rejected.

The radius 30 may comprise any dimension selected with consideration of the conduction delay from the pressure inlet port 6 to the sensor 10, and with consideration of permitting conduction of a first component of unsteady pressure 4 between the pressure inlet port 6 and the sensor 10 while rejecting a second component of unsteady pressure 4. In various embodiments, the radius is variable, although in further embodiments, the radius is constant. The radius 30 may comprise about 0.03 inches (about 0.76 mm).

Similarly, the length 32 may comprise any length selected with consideration of the conduction delay from the pressure inlet port 6 and the sensor 10, and with consideration of permitting conduction of a first component of unsteady pressure 4 between the pressure inlet port 6 and the sensor 10 while rejecting a second component of unsteady pressure 4. The length 32 may comprise any distance. For instance the length 32 may comprise about one foot (about 30.4 cm) or more. For example, the length 32 may comprise about five feet (about 1.5 meters).

In response to the shape 28, radius 30, and length 32, a tuned path 8 may exhibit a behavior 34. For example, behavior 34 may comprise a low-pass filter behavior. A low-pass filter behavior may comprise a roll-off frequency 36. A roll-off frequency 36 may be a frequency disposed between a first component of unsteady pressure 4 and a second component of unsteady pressure 4 and may indicate the upper-bound frequency component of unsteady pressure 4 conducted between pressure inlet port 6 and the sensor 10. The roll-off frequency may denote a 3-dB point of the behavior 34. In this manner, a low pass filter behavior may be exhibited. In further embodiments, a tuned path 8 may comprise a band pass filter behavior, or a resonant behavior, or any desired behavior in response to the shape 28, radius 30, and length 32.

Figure 4A:
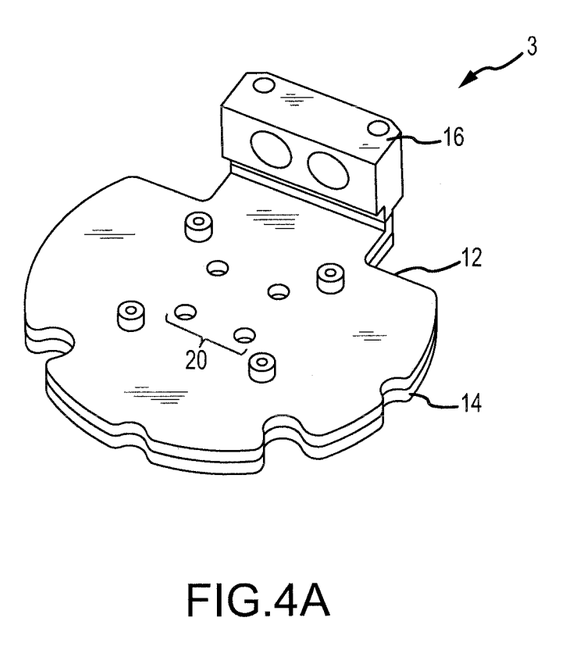
FIGS. 4A-C depict views of an example embodiment of a tuned sensor system comprising a modular tuned sensor system, in accordance with various embodiments.
Figure 4B:
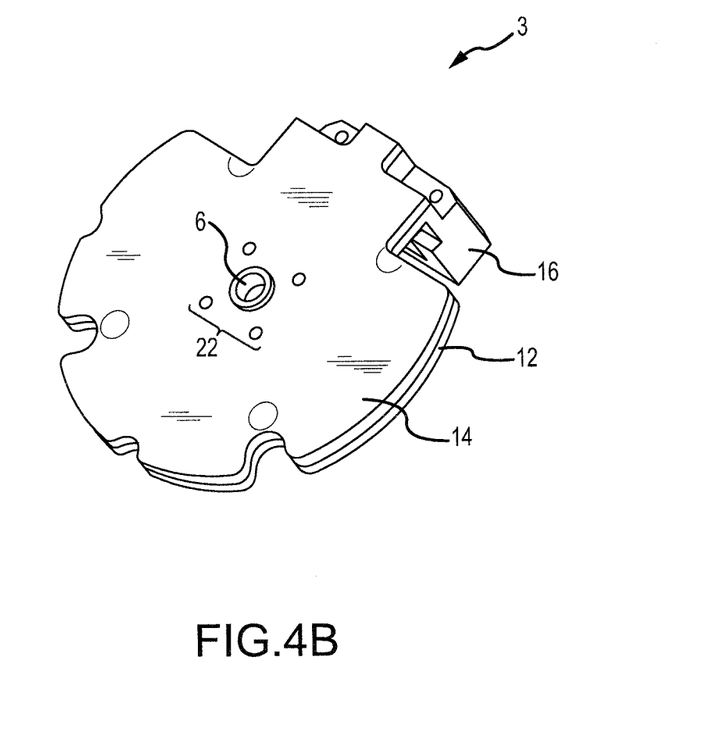
Figure 4C:
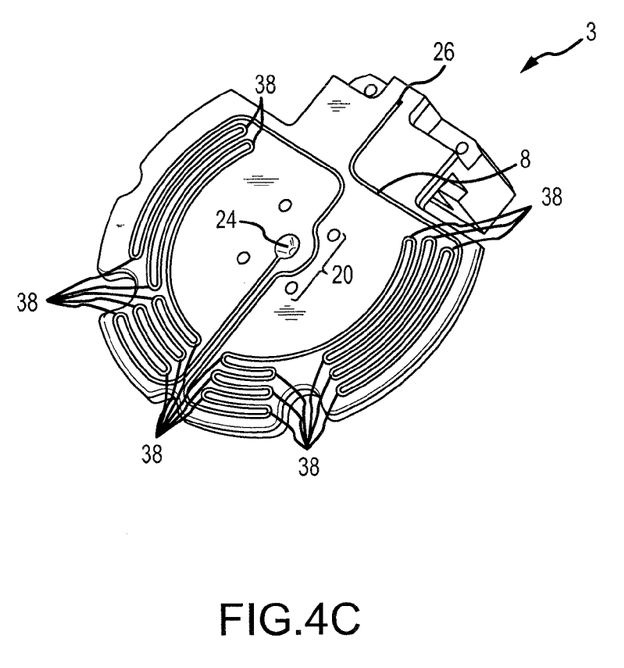

With reference now to FIGS. 4A-C, a tuned sensor system 2 (FIGS. 1 and 2) may be implemented in a modular tuned sensor system 3. For instance, a modular tuned sensor system 3 may comprise components of a tuned sensor system 2, in addition to further components. Moreover, a modular tuned sensor system 3 may comprise a compact subsystem readily installable proximate to the desired location of a pressure inlet port 6.

Accordingly, a modular tuned sensor system 3 may comprise a main body 12 and an enclosing member 14. The modular tuned sensor system 3 may also comprise a sensor 10. The main body 12 may comprise a substantially planar structure. The main body may have a substantially circular profile, though any desired structure and profile may be contemplated. For instance, the main body 12 may be cubic with a substantially trapezoidal profile. The enclosing member 14 may comprise a structure corresponding to at least one face of the main body 12 and arranged to be mechanically joined to the main body 12, such as by fasteners. Finally, the modular tuned sensor system 3 may comprise a sensor 10. The sensor 10 (with momentary reference to FIG. 1) may be mounted to a sensor mount 16 of the main body 12.

With reference to FIGS. 1 and 4A-4C, the main body 12 may comprise a tuned path 8. The tuned path 8 may comprise a channel disposed in the main body 12. In various embodiments, the tuned path 8 comprises a semi-circular profile, for example—one half of a circular profile illustrated in FIG. 2.

The main body 12 may further comprise a sensor mount 16. The sensor mount 16 may comprise a structure that supports a sensor 10 and positions the sensor 10 in fluidic communication with the tuned path 8. In various embodiments, the sensor mount 16 comprises a trapezoidal boss extending normal to a surface plane of the main body 12.

The main body may further comprise a sensor terminus 26. The sensor terminus 26 may receive pressure introduced from the tuned path 8 desired to be sensed, and may conduct this pressure to a sensor 10 mounted in the sensor mount 16. Accordingly, the sensor terminus 26 may be positioned to be in fluidic communication with the tuned path 8 of the main body 12. In various embodiments, the sensor terminus 26 comprises an aperture defined in the main body 12 and bounded by the main body 12 proximate to the sensor mount 16 and in fluidic communication with the tuned path 8. The sensor terminus 26 may receive the second component of the unsteady pressure 4 and convey it to the sensor 10.

The main body 12 may further comprise main body mounting hardware 20. Main body mounting hardware 20 may comprise any feature whereby the main body 12 may be joined with an enclosing member 14. For instance, in various embodiments, main body mounting hardware 20 comprises fastener apertures aligned to permit the insertion of fasteners through the main body 12 and into/through the enclosing member 14. In further embodiments, main body mounting hardware 20 comprises registration members, such as alignment pins, or comprises grooves and/or ridges configured to correspond to features of the enclosing member 14, such as corresponding enclosing member mounting hardware 22 of the enclosing member 14.

The main body 12 may comprise a pressure inlet port interface 24. A pressure inlet port interface 24 may comprise a void defined by the main body 12 and aligned corresponding to a pressure inlet port 6 of an enclosing member 14. Pressure may be introduced through the pressure inlet port 6 of an enclosing member 14, and may be conducted from the pressure inlet port 6 of the enclosing member 14, to the tuned path 8 of the main body 12, by the pressure inlet port interface 24. In various embodiments, the pressure inlet port interface 24 comprises a substantially disc shaped void defined by the main body 12 and disposed at the circumferential center of the main body 12. The pressure inlet port interface 24 may be disposed at one end of the tuned path 8 and may be in fluidic communication with the tuned path 8 and the pressure inlet port 6 of the enclosing member 14.

The enclosing member 14 may comprise a substantially planar structure. The enclosing member 14 may have a substantially circular profile, though any desired structure and profile may be contemplated, provided that the enclosing member 14 corresponds to at least one face of the main body 12 and is arranged to be mechanically joined to the main body 12, such as by fasteners. The enclosing member 14 may define a portion of the tuned path 8 of the main body 12, sealing the tuned path 8 from leaking (e.g., fluidic communication with the external environment, except at the pressure inlet port 6 of the enclosing member 14 (and the sensor terminus and/or sensor 10)). In various embodiments, the enclosing member 14 may define a portion of the tuned path 8 of the main body 12 with an enclosing planar face. In further embodiments, the enclosing member 14 may define a portion of the tuned path 8 of the main body 12 with a semi-circular profile; for example, one half of a circular profile illustrated in FIG. 2, and corresponding to that of the main body 12.

The enclosing member 14 may comprise a pressure inlet port 6. The pressure inlet port 6 may receive pressure introduced from the external environment desired to be sensed, and may conduct this pressure to the tuned path 8. Accordingly, the pressure inlet port 6 of the enclosing member 14 may be positioned to be in fluidic communication with the tuned path 8 of the main body 12. In various embodiments, the pressure inlet port 6 is positioned at the circumferential center of the enclosing member 14. The pressure inlet port 6 may correspond in location to the pressure inlet port interface 24 of the tuned path 8 and may be in fluidic communication with the pressure inlet port interface 24 of the tuned path 8. The pressure inlet port 6 may receive an unsteady pressure 4. An unsteady pressure 4 may comprise an air pressure having unwanted variations. For example, an unsteady pressure 4 may be a substantially static pressure superimposed with a high frequency variation, such as a pressure variation caused by a rotating propeller.

The enclosing member 14 may comprise enclosing member mounting hardware 22. Enclosing member mounting hardware 22 may comprise any feature whereby the enclosing member 14 may be joined with a main body 12. For instance, in various embodiments, enclosing member mounting hardware 22 comprises fastener apertures aligned to permit the insertion of fasteners through the main body 12 and into/through the enclosing member 14. In further embodiments, enclosing member mounting hardware 22 comprises registration members, such as alignment pins, or comprises grooves and/or ridges configured to correspond to features of the main body 12, such as corresponding main body mounting hardware 20 of the main body 12.

With specific reference to FIG. 4C as well as FIG. 2, a tuned path 8 may comprise one or more turn 38. By incorporating one or more turn 38 in a tuned path 8, the tuned path 8 may achieve a desired length 32 (FIG. 2) and yet may occupy a compact space disposed wholly within the dimensional bounds of the main body 12 and the enclosing member 14. Thus, the sensor 10 may be mounted near to the pressure inlet port 6, yet the unsteady pressure 4 may travel a much longer distance to transit between the pressure inlet port 6 and the sensor 10. The distance between the pressure inlet port 6 and the sensor terminus 26 may be less than a length of the tuned path 8. For example, in embodiments wherein the main body 12 and the enclosing member 14 both have a circular profile and a radius of about 3½ inches (about 8.9 cm), the tuned path 8 may have a length 32 of about one foot (about 0.3 m) or more, for instance about five feet (about 1.5 m).

The tuned path 8 may terminate at the pressure inlet port interface 24 of the main body 12. The pressure inlet port interface 24 may be disposed at one end of the tuned path 8 and may be in fluidic communication with the tuned path 8 and the pressure inlet port 6 of the enclosing member 14.

The tuned path 8 may terminate at a sensor terminus 26. The sensor terminus 26 may be disposed at the opposite terminal end of the tuned path 8 from the pressure inlet port interface 24 of the main body 12. The sensor terminus 26 may be in fluidic communication with the tuned path 8 and the sensor mount 16, and be positioned in such a manner as to further be in fluidic communication with a sensor 10 that may be mounted in the sensor mount 16.

With reference to FIGS. 1-4C, and having discussed various aspects of a tuned sensor system 2 and a modular tuned sensor system 3, a tuned sensor system 2 and/or a modular tuned sensor system 3 may be made of many different materials or combinations of materials. For example, various components of the system may be made from metal. For example, various aspects of a main body 12 and an enclosing member 14 may comprise metal, such as titanium, aluminum, steel, or stainless steel, though it may also comprise numerous other materials configured to provide support, such as, for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of tuned sensor system 2 and/or a modular tuned sensor system 3 as disclosed herein are made of different materials or combinations of materials, and/or may comprise coatings. For example, the interior of a tuned path 8 may comprise a coating having a texture, such as to calibrate high frequency rejection characteristics. Similarly, various gaskets and seals may be introduced, such as at apertures, or at the junction of main body 12 and enclosing member 14, and comprising rubber, silicone, plastic, or any desired material.

In various embodiments, tuned sensor system 2 and/or modular tuned sensor system 3 may comprise multiple materials, or any material configuration suitable to enhance or reinforce the resiliency and/or support of the system when subjected to wear in an aircraft operating environment or to satisfy other desired electromagnetic, chemical, physical, or material properties, for example weight, heat tolerance, thermal conductivity, radar signature, ferromagnetic properties, ductility, strength, durability, and other properties.

While the systems described herein have been described in the context of aircraft applications; however, one will appreciate in light of the present disclosure, that the systems described herein may be used in various other applications, for example, different vehicles, such as cars, trucks, busses, trains, boats, and submersible vehicles, space vehicles including manned and unmanned orbital and sub-orbital vehicles, or any other vehicle or device, or in connection with industrial processes, or propulsion systems, or any other system or process having need for pressure sensing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A modular tuned sensor system comprising:
a main body having a tuned path in fluidic communication with a pressure inlet port;
an enclosing member having a planar structure defining a portion of the tuned path of the main body and sealing the tuned path from leaking; and the pressure inlet port having an aperture disposed in the enclosing member; and
a sensor terminus having an aperture defined through the main body and in fluidic communication with the tuned path, the sensor terminus disposed at an opposite end of the tuned path from the pressure inlet port,
wherein the pressure inlet port is configured to be aligned to at least one of an opening in an external surface of an aircraft and an opening in a propulsion system surface.

2. The modular tuned sensor system according to claim 1, wherein the tuned path comprises a channel disposed in the main body and receiving an unsteady pressure from the pressure inlet port, and
wherein the pressure inlet port is in fluidic communication with an external environment.

3. The modular tuned sensor system according to claim 2, wherein the unsteady pressure comprises a first component with a static pressure and a second component with a high frequency variable pressure, and
wherein the tuned path blocks the second component and transmits the first component from the pressure inlet port to the sensor terminus.

4. The modular tuned sensor system according to claim 1, wherein the tuned path comprises a plurality of turns, whereby a distance between the pressure inlet port and the sensor terminus is less than a length of the tuned path.

5. The modular tuned sensor system according to claim 1, the main body further comprising a pressure inlet port interface with a void defined by the main body and aligned corresponding to the pressure inlet port of the enclosing member.

6. The modular tuned sensor system according to claim 5, the pressure inlet port further comprising a disc shaped void defined by the main body and disposed at a circumferential center of the main body.

7. The modular tuned sensor system according to claim 1, the main body further comprising main body mounting hardware and the enclosing member further comprising enclosing member mounting hardware, whereby fasteners may be inserted through at least one of the main body and the enclosing member and the main body and the enclosing member may be retained in fixed mechanical communication with one another.

8. The modular tuned sensor system according to claim 1, wherein the main body further comprises a sensor mount, and wherein the sensor terminus is further defined through a surface of the sensor mount.

9. The modular tuned sensor system according to claim 8, further comprising a sensor attached to the sensor mount and in fluidic communication with the sensor terminus.

10. The modular tuned sensor system according to claim 1, wherein the tuned path comprises:
    a shape having a tubular structure with a circular cross-section;
    a radius of about 0.03 inches; and
    a length of at least about one foot.

11. The modular tuned sensor system according to claim 10, wherein the tuned path comprises a behavior exhibited in response to the shape, the radius, and the length.

12. The modular tuned sensor system according to claim 11, wherein the behavior comprises a low pass filter with a roll-off frequency disposed between the first component and the second component.

13. The modular tuned sensor system according to claim 11, wherein the behavior comprises a band pass filter.

14. A tuned sensor system comprising:
    a pressure inlet port receiving an unsteady pressure with a first component having a static pressure and a second component having a high frequency variable pressure from an external environment; and
    a tuned path receiving the unsteady pressure from the pressure inlet port and conducting the first component to a sensor terminus and blocking the second component,
    wherein a distance between the pressure inlet port and the sensor terminus is less than a length of the tuned path, and
    the pressure inlet port is configured to be aligned to at least one of an opening in an external surface of an aircraft and an opening in a propulsion system surface.

15. The tuned sensor system of claim 14, wherein the tuned path comprises:
    a shape having a tubular structure with a circular cross-section; and
    a radius of about 0.03 inches.

16. The tuned sensor system of claim 14, wherein the tuned path comprises a low pass filter with a roll-off frequency disposed between the first component and the second component.

17. The tuned sensor system according to claim 14, wherein the tuned path comprises a turn.

18. The tuned sensor system according to claim 14, further comprising a sensor in fluidic communication with the sensor terminus and providing an electronic signal in response to the first component.

19. A method of pneumatic filtering comprising:
    receiving an unsteady pressure at a pressure inlet port wherein the unsteady pressure has a first component with a static pressure and a second component with a variable pressure;
    conducting the unsteady pressure from the pressure inlet port to a tuned path disposed in a main body;
    transmitting the first component of the unsteady pressure to a sensor terminus; and
    blocking the second component of the unsteady pressure, wherein the tuned path comprises a plurality of turns, whereby a distance between the pressure inlet port and the sensor terminus is less than a length of the tuned path.

* * * * *